United States Patent [19]

Shekelton et al.

[11] Patent Number: 4,970,865

[45] Date of Patent: Nov. 20, 1990

[54] SPRAY NOZZLE

[75] Inventors: Jack R. Shekelton, San Diego; Robert W. Smith, Lakeside, both of Calif.

[73] Assignee: Sundstrand Corporation, Rockford, Ill.

[21] Appl. No.: 283,082

[22] Filed: Dec. 12, 1988

[51] Int. Cl.[5] .......................... F02C 7/22; F23R 3/28

[52] U.S. Cl. ........................................ 60/757; 60/737; 60/742; 60/743; 239/533.9

[58] Field of Search ...................... 60/737, 39.141, 742, 60/743, 39.826, 39.821; 239/533.9, 533.3, 524

[56] References Cited

U.S. PATENT DOCUMENTS 2,110,116 3/1938 Alfaro .............................. 239/533.9
2,579,614 12/1951 Ray .
2,583,416 1/1952 Clarke et al. .
2,701,164 2/1955 Purchas, Jr. et al. .
2,703,260 3/1955 Olson et al. .
2,782,597 2/1957 Parsons et al. .
2,828,608 4/1958 Cowlin et al. .
2,959,003 11/1960 Carlisle et al. .
3,306,333 2/1967 Mock .
3,333,414 8/1967 Saintsbury .
3,391,535 7/1968 Benjamin .
3,638,865 2/1972 McEneny et al. .................... 60/742
3,703,259 11/1972 Sturgess et al. ....................... 60/742
3,945,574 3/1976 Polnauer et al. .
4,121,419 10/1978 Kuznetson et al. .............. 60/39.826
4,216,651 8/1980 Ormerod .
4,258,544 3/1981 Gebhart et al. .
4,265,085 5/1981 Fox et al. .
4,418,543 12/1983 Faucher et al. .
4,528,951 7/1985 Yamada ............................ 239/533.3
4,674,286 6/1987 Thatcher et al. .
4,815,665 3/1989 Haruch ............................... 239/524

*Primary Examiner*—Louis J. Casaregola
*Assistant Examiner*—Timothy S. Thorpe
*Attorney, Agent, or Firm*—Wood, Phillips, Mason, Recktenwald & VanSanten

[57] ABSTRACT

A spray nozzle including a body having a fluid inlet at one end thereof and an exit orifice at the other end thereof. The fluid inlet communicates with the exit orifice through a fluid flow path extending through the body. The exit orifice is adapted to atomize the fluid as the fluid leaves the body. The spray nozzle also includes a separate portion for atomizing the fluid independent of the exit orifice. The separate portion communicates with the fluid flow path upstream of the exit orifice. The separate portion produces a flat spray of the fluid as the fluid leaves the body. With these features, the spray nozzle is well suited as a fuel injector for a gas turbine.

19 Claims, 2 Drawing Sheets

SPRAY NOZZLE

FIELD OF THE INVENTION

This invention relates to spray nozzles for atomizing fluids and, more particularly, to a gas turbine fuel injector spray nozzle.

BACKGROUND OF THE INVENTION

It has long been known in gas turbine technology that good fuel atomization for ignition and low speed acceleration is an important requisite. A start injector is usually provided for this purpose but, under the conditions encountered at start up and low speed acceleration, performance can nevertheless prove to be far less than satisfactory. In this connection, the main fuel atomization is usually poor particularly at low altitude on cold days considering the viscous nature of fuel.

As a result, it would be desirable to add another start injector to insure sufficient fuel atomization for achieving satisfactory ignition. However, this would be a very difficult and expensive retrofit problem and, therefore, is not a satisfactory solution for the many gas turbines already in use. For this reason, it would be most desirable to provide a two-start injector capability requiring only simple modifications to a standard start injector.

The present invention is directed to overcoming the above stated problems and accomplishing the noted objects by providing a unique gas turbine fuel injector spray nozzle.

SUMMARY OF THE INVENTION

It is a principal object of the invention to provide a new and improved spray nozzle. More specifically, it is an object of the invention to provide a fuel injector spray nozzle particularly suited for a gas turbine. Furthermore, it is an object of the invention to provide dual means for atomizing fuel.

An exemplary embodiment of the invention achieves the foregoing objects in a spray nozzle comprising a body having fluid inlet means at one end thereof and exit orifice means at the other end thereof The fluid inlet means communicates with the exit orifice means through a fluid flow path extending through the body. The exit orifice means is adapted to atomize a fluid as the fluid leaves the body. The spray nozzle also includes separate means for atomizing the fluid independent of the exit orifice means. The separate atomizing means communicates with the fluid flow path upstream of the exit orifice means. The separate atomizing means also produces a flat spray of the fluid as the fluid leaves the body. With these features, the spray nozzle is particularly well suited for use as a fuel injector spray nozzle in a gas turbine.

Preferably, the orifice means operates so as to atomize the fluid in a manner producing a conical sray as the fluid leaves the body. The fluid flow path leading to the orifice means is advantageously defined at least in part by a generally cylindrical passage through the body, and the separate atomizing means communicates with this passage through an axially extending offset bore. Further, the separate atomizing means preferably includes a flat impingement surface spaced from the axially extending offset bore.

In the preferred embodiment, the spray nozzle is a start injector for a gas turbine. The gas turbine preferably includes an annular combustor having a generally cylindrical wall in which at least one igniter and fuel injection means are mounted, and the annular combustor preferably but not necessarily includes means for producing swirl in a mixture of fuel and air in a preselected direction therewithin. With this arrangement, the start injector spray nozzle is also mounted in the annular combustor.

More specifically, the start injector spray nozzle which has inlet means for fuel at one end thereof and exit orifice means for the fuel at the other end thereof, is mounted so as to extend generally radially relative to the annular combustor. The inlet means is generally coaxial with the exit orifice means and communicates with the exit orifice means through a fluid flow path which extends through the body. Still further, the exit orifice means is disposed within the annular combustor so as to atomize the fuel to produce a generally conical spray of the mixture which is injected radially into the annular combustor as the mixture leaves the body.

In the gas turbine, separate means associated with the body of the spray nozzle is provided for atomizing a portion of the fuel independent of the exit orifice means. The separate atomizing means is, as before, axially offset from the exit orifice means. Moreover, the separate atomizing means operates so as to produce a flat spray of the fuel generally in the preselected swirl direction as the mixture leaves the body.

Advantageously, the flow path is defined at least in part by a generally cylindrical passage extending through the body so as to be coaxial with the body, inlet means and orifice means. The separate atomizing means then communicates with the passage at a point upstream of the orifice means through a bore in the body disposed in axially offset relation to the orifice means. The separate atomizing means then also includes a flat impingement surface disposed at an acute angle to a plane extending transversely of said body in spaced relation to said bore to direct the flat spray of fuel tangentially which will be in the preselected swirl direction in applications where there is such swirl. In this connection, the flat impingement surface is defined by a generally wedge-shaped cut-out in the body causing the flat spray to be directed away from the body tangentially in the preselected swirl direction in a plane defined by the impingement surface.

Other objects, advantages and features of the present invention will become apparent from a consideration of the following specification taken in conjunction with the accompanying drawings.

DETAILED DESCRIPTION OF THE PREFERRED EMBODIMENT

Figure 1:
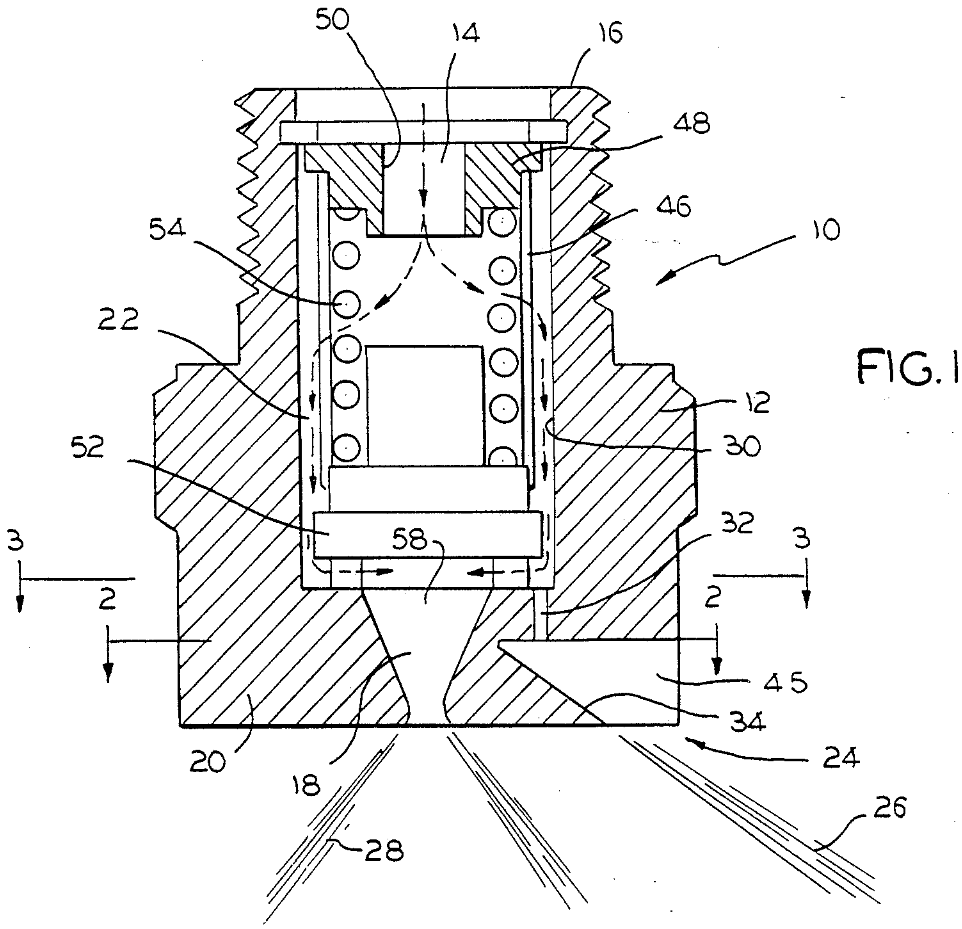
FIG. 1 is a cross sectional view of a spray nozzle in accordance with the present invention.

An exemplary embodiment of a gas turbine fuel injector spray nozzle is illustrated in the drawings. However, the invention is not so limited, having applicability to any form of spray nozzle requiring a separate atomizer.

Referring to the drawings, the reference numeral 10 designates generally a spray nozzle comprising a body 12 having fluid inlet means 14 at one end 16 thereof and exit orifice means 18 at the other end 20 thereof. The fluid inlet means 14 communicates with the exit orifice means 18 through a fluid flow path generally designated 22 which extends through the body 12. The exit orifice means 18 is adapted to atomize a fluid passing from the fluid inlet means 14 through the fluid flow path 22 as the fluid leaves the body 12. The spray nozzle 10 also includes separate means generally as illustrated at 24 for atomizing the fluid independent of the exit orifice means 18. The separate atomizing means at 24 is in fluid communication with the fluid flow path 22 at a point upstream of the exit orifice means 18. The separate atomizing means at 24 operates in such a manner as to produce a flat spray 26 of the fluid as at 26 as the fluid leaves the body 12. Preferably, the orifice means 18 produces a conical spray as at 28 as the fluid leaves the body 12.

Figure 2:
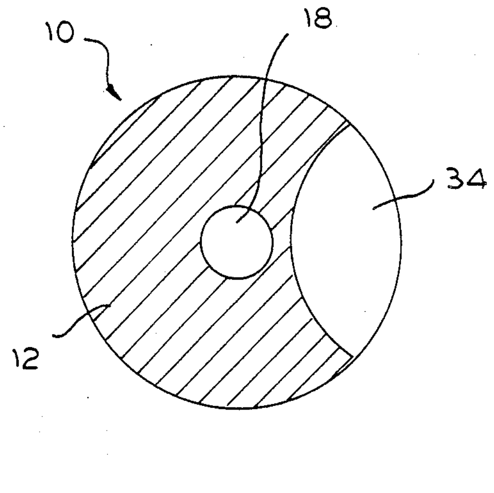
FIG. 2 is a cross sectional view taken on the line 2—2 of FIG. 1.

As will be appreciated by referring to FIG. 1, the fluid flow path 22 is defined at least in part by a generally cylindrical passage 30 through the body 12. The separate atomizing means at 24 communicates with the generally cylindrical passage 30 through an axially extending offset bore 32. As best understood by referring to FIGS. 1 and 2, the separate atomizing means at 24 preferably includes a flat impingement surface 34 spaced from the axially extending offset bore 32. However, other means of generating a flat spray known in the art without using an impingement surface, such as a fuel discharging, circular orifice terminating in an elongated discharge slot, may be used if desired.

Figure 4:
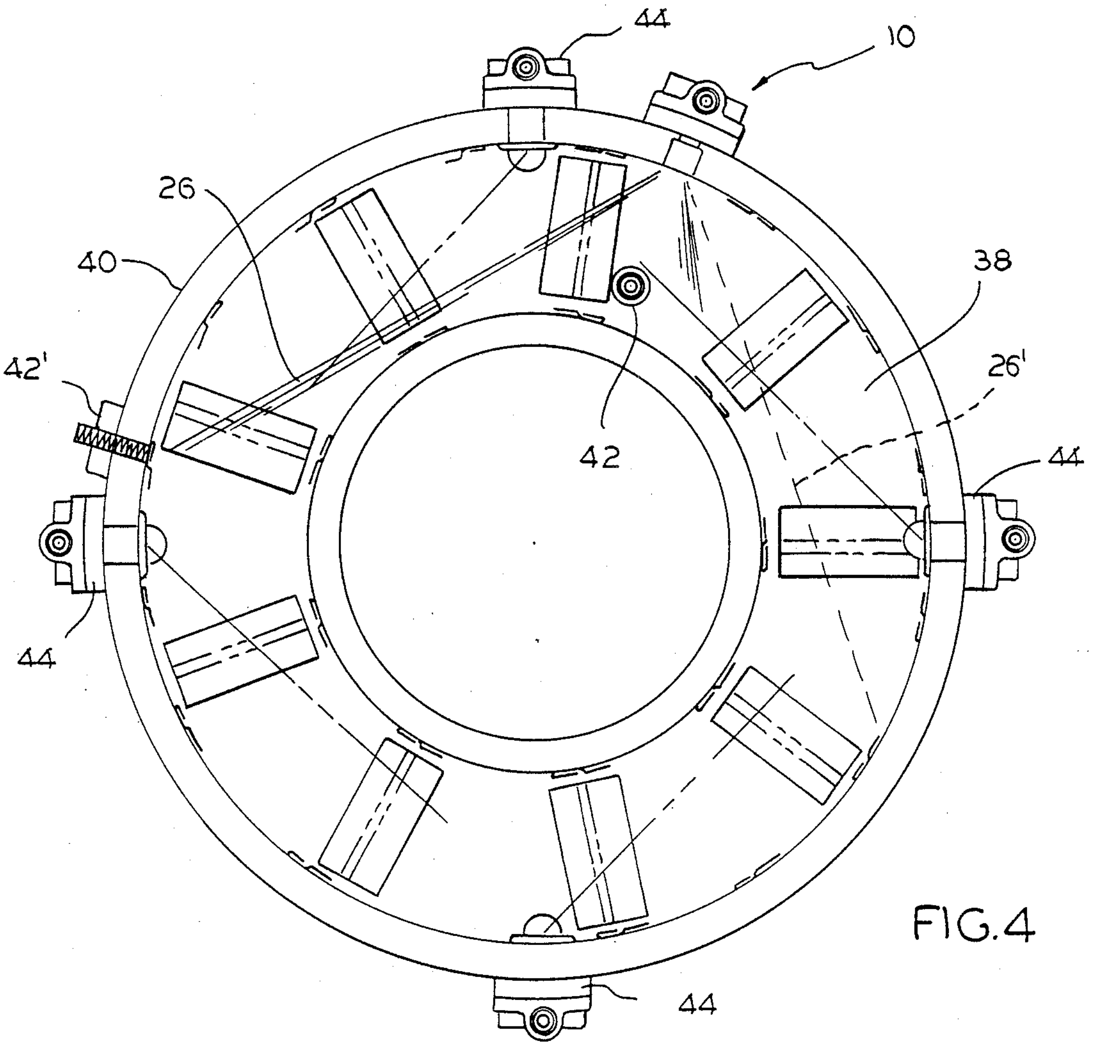
FIG. 4 is a cross sectional view of a gas turbine utilizing the inventive spray nozzle.

Referring to FIG. 4, an annular combustor 38 of a gas turbine (not shown) is illustrated as having a generally cylindrical wall 40. The annular combustor 38 preferably but not necessarily includes known means for producing swirl in a mixture of fuel and air in a preselected direction, e.g., counterclockwise, as shown therewithin, and includes at least one ignitor 42 mounted therein. As will further be appreciated from FIG. 4, the annular combustor 38 includes fuel and air injection means 44 mounted in the generally cylindrical wall 40.

Furthermore, a start injector spray nozzle 10 having a generally cylindrical body 12 is mounted in the annular combustor 38 so as to extend generally radially relative thereto and having fuel inlet means 14 at one end 16 thereof and exit orifice means 18 at the other end 20 thereof (see, also, FIG. 1). The inlet means 14 is generally coaxial with the exit orifice means 18 and communicates with the exit orifice means 18 through the fluid flow path 22 which extends through the body 12. Additionally, the exit orifice means 18 is disposed within the annular combustor 38 and adapted to atomize the fuel to produce the generally conical spray as at 28 which is injected radially into the annular combustor 38 as the fuel leaves the body 12 substantially as illustrated.

As shown, the separate means at 24 is associated with the body 12 in such a manner as to atomize a portion of the fuel independent of the exit orifice means 18. The separate atomizing means at 24 is axially offset from the exit orifice means 18 and communicates with the fluid flow path 22 upstream of the exit orifice means 18 and with the annular combustor 38. With this arrangement, the separate atomizing means at 24 produces the flat spray of the fuel as at 26 which is injected generally in the preselected swirl direction in applications where there is such swirl as the fuel leaves the body 12.

As will be clear from FIG. 1, the generally cylindrical passage 22 extends through the body 12 in such a manner so as to be coaxial with the body, the inlet means 14 and the orifice means 18. It will also be noted by comparing FIGS. 1 and 2 that the flat impingement surface 34 is disposed at an acute angle to a plane extending transversely of the body 12 in spaced relation to the bore 32 to direct the flat spray of the fuel tangentially of the preselected swirl direction in applications where there is such swirl. In this connection, the flat impingement surface 34 is defined by a generally wedge-shaped cut-out 45 in the body 12 causing the flat spray to be directed away from the body in a plane defined by the impingement surface 34.

If desired, the separate atomizing means may include a pair of spaced apart and diametrically opposed bores such as 32 in the body 12 each of which communicates with the passage 22 at respective points upstream of the orifice means 18 in axially offset relation thereto. The separate atomizing means will then also include a pair of spaced apart and diametrically opposed flat impingement surfaces such as 34 disposed at oppositely facing acute angles to a plane extending transversely of the body 12 in spaced relation to the respective bores such as 32. The flat impingement surfaces such as 34 will then be positioned in such a manner as to direct flat sprays such as 26 and 26' of the fuel in opposite tangential directions relative to the preselected swirl direction. In other words, the flat impingement surfaces such as 34 will project flat auxiliary fuel sprays 26 and 26' in opposite directions within the annular combustor 38 as will be appreciated by making specific reference to the schematic spray representations in FIG. 4.

In either case, i.e., one or two flat sprays, the spray nozzle 10 will provide a flat impingement auxiliary fuel spray or sprays thereby significantly enhancing the start up and low acceleration characteristics of the gas turbine (not shown). It will be appreciated that the flat spray or sprays such as 26 and 26' will extend in a generally tangential direction (preferably at least in the direction of swirl as represented by flat spray 26 where the direction of swirl is counterclockwise), although it should be recognized that the second tangential fuel spray such as 26' will result in less dramatic improvement. In any event, in an annular combustor having a strong swirl component, such a double or triple spray arrangement, i.e., flat spray 26, conical spray 28 and potentially flat spray 26', may be most advantageously utilized.

Figure 3:
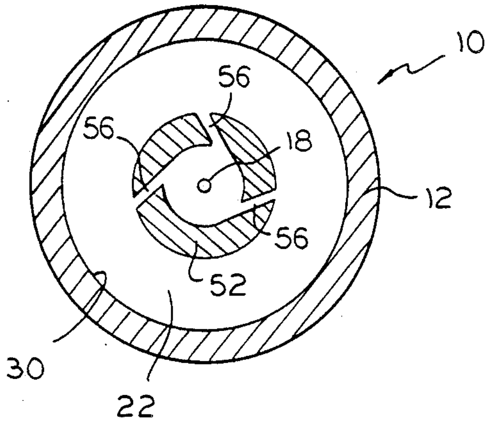
FIG. 3 is a cross sectional view taken on the line 3—3 of FIG. 1.

Referring once again to FIG. 3, it may be desirable to add another igniter 42'. It will be seen and appreciated that this igniter 42' has been mounted in the annular combustor 38 substantially directly in line with the flat spray 26 which would, of course, enhance starting reliability, i.e., the use of two ignitors would enhance reliability, as well as low acceleration performance. Still other variations of this type will occur to those skilled in the art.

Referring once again to FIG. 1, the spray nozzle 10 is for the most part a conventional start injector of the swirl pressure atomizing sort. This start injector includes, among other things, a screen 46 disposed in the flow path 22 between the inlet means 14 and orifice means 18 which can serve to filter fuel passing through the body 12 into the annular combustor 38, and it also includes an inlet fitting 48 having a central bore 50 therethrough defining the inlet means 14, a slotted distributor 52 separated from the inlet fitting 48 by means of a spring 54 and having swirl slots as at 56 through which the fuel passes to reach the exit orifice means 18, and a swirl cavity 58 within the orifice means 18 immediately downstream of the swirl slots 56. Of course, the operation of these aspects of the start injector 10 are conventional and understood by those skilled in the art.

While in the foregoing there has been set forth a preferred embodiment of the invention, it will be understood that the details herein given are for purposes of illustration and the invention is only to be limited by the spirit and scope of the appended claims.

We claim:

1. A spray nozzle, comprising:

a body having fluid inlet means at one end thereof and exit orifice means at the other end thereof, said fluid inlet means communicating with said exit orifice means through a fluid flow path extending through said body, said exit orifice means being adapted to atomize a fluid as said fluid leaves said body; and separate means for atomizing said fluid independent of said exit orifice means, said separate atomizing means being axially offset and eccentrically positioned relative to said exit orifice means and communicating with said fluid flow path upstream of said exit orifice means, said separate atomizing means producing a flat spray of said fluid as said fluid leaves said body.

2. The spray nozzle as defined by claim 1 wherein said orifice means atomizes said fluid to produce a conical spray as said fluid leaves said body.

3. The spray nozzle as defined by claim 1 wherein said fluid flow path is defined at least in part by a generally cylindrical passage through said body.

4. The spray nozzle as defined by claim 3 wherein said separate atomizing means communicates with said generally cylindrical passage through an axially extending offset bore.

5. The spray nozzle as defined by claim 4 wherein said separate atomizing means includes a flat impingement surface spaced from said axially extending offset bore.

6. A fuel injector spray nozzle, comprising:

a generally cylindrical body having fuel inlet means at one end thereof and exit orifice means at the other end thereof, said inlet means being generally coaxial with said exit orifice means and communicating with said exit orifice means through a fluid flow path extending through said body, said exit orifice means being adapted to atomize a fuel producing a generally conical spray as said fuel leaves said body; and separate means for atomizing a portion of said fuel independent of said exit orifice means, said separate atomizing means being axially offset and eccentrically positioned relative to said exit orifice means and communicating with said fluid flow path upstream of said exit orifice means, said separate atomizing means producing a flat spray of said fuel as said fuel leaves said body.

7. The fuel injector spray nozzle as defined by claim 6 wherein said flow path is defined at least in part by a generally cylindrical passage extending through said body so as to be coaxial with said body, said inlet means and said orifice means.

8. The fuel injector spray nozzle as defined by claim 7 wherein said separate atomizing means communicates with said passage at a point upstream of said exit orifice means through a bore in said body disposed in axially offset relation to said orifice means.

9. The fuel injector spray nozzle as defined by claim 8 wherein said separate atomizing means includes a flat impingement surface disposed at an acute angle to a plane extending transversely of said body in spaced relation to said bore to direct said flat spray in a preselected direction.

10. The fuel injector spray nozzle as defined by claim 9 wherein said flat impingement surface is defined by a generally wedge-shaped cut-out in said body causing said flat spray to be directed away from said body generally in the plane defined by said impingement surface.

11. A gas turbine, comprising:

an annular combustor having a generally cylindrical wall, said annular combustor including means for producing swirl in a mixture of fuel and air in a preselected direction therewithin and including at least one igniter mounted therein, said annular combustor including fuel injection means mounted therein;

a start injector spray nozzle having a generally cylindrical body mounted in said annular combustor so as to extend generally radially relative thereto and having fuel inlet means at one end thereof and exit orifice means at the other end thereof, said inlet means being generally coaxial with said exit orifice means and communicating with said exit orifice means through a fluid flow path extending through said body, said exit orifice means being disposed within said annular combustor and adapted to atomize a fuel to produce a generally conical spray injected radially into said annular combustor as said fuel leaves said body; and separate means associated with said body for atomizing a portion of said fuel independent of said exit orifice means, said separate atomizing means being axially offset and eccentrically positioned relative to said exit orifice means and communicating with said fluid flow path upstream of said exit orifice means and with said annular combustor, said separate atomizing means producing a flat spray of said fuel generally in said preselected swirl direction as said fuel leaves said body.

12. The gas turbine as defined by claim 11 wherein said flow path is defined at least in part by a generally cylindrical passage extending through said body so as to be coaxial with said body, said inlet means and said orifice means.

13. The gas turbine as defined by claim 12 wherein said separate atomizing means communicates with said passage at a point upstream of said orifice means through a bore in said body disposed in axially offset relation to said orifice means.

14. The gas turbine as defined by claim 13 wherein said separate atomizing means includes a flat impingement surface disposed at an acute angle to a plane extending transversely of said body in spaced relation to said bore to direct said flat spray of said fuel tangentially of said preselected swirl direction.

15. The gas turbine as defined by claim 14 wherein said flat impingement surface is defined by a generally wedge-shaped cut-out in said body causing said flat spray to be directed away from said body tangentially of said preselected swirl direction in a plane defined by said impingement surface.

16. The gas turbine as defined by claim 12 wherein said separate atomizing means includes a pair of spaced apart and diametrically opposed bores in said body communicating with said passage at respective points upstream of said orifice means in axially offset relation thereto.

17. The gas turbine as defined by claim 16 wherein said separate atomizing means includes a pair of spaced apart and diametrically opposed flat impingement surfaces disposed at oppositely facing acute angles to a plane extending transversely of said body in spaced relation to said respective bores.

18. The gas turbine as defined by claim 17 wherein said flat impingement surfaces are positioned so as to direct flat sprays of said fuel in opposite tangential directions relative to said preselected swirl direction.

19. The gas turbine as defined by claim 18 wherein said flat impingement surfaces are defined by generally wedge-shaped oppositely facing cut-outs in said body causing said tangentially oppositely directed flat sprays in the planes defined by said impingement surfaces.

* * * * *